United States Patent Office 3,484,930
Patented Dec. 23, 1969

3,484,930
WELDING PROCESS FOR HIGH TENSILE STRENGTH STEEL
Hajima Nakamura and Yoshio Akita, Tokyo-to, Japan, assignors to Ishikawajima-Harima Jukogyo Kabushiki Kaisha, Chiyoda-ku, Tokyo-to, Japan, a company of Japan
Filed June 23, 1965, Ser. No. 466,146
Claims priority, application Japan, Mar. 4, 1965, 40/12,578
Int. Cl. B23k 31/02
U.S. Cl. 29—497        5 Claims

ABSTRACT OF THE DISCLOSURE

A process of welding high tensile strength steel having a tensile strength of more than 80 kg./mm.$^2$ and having a tendency to fail at a conventional welded connection due to brittleness. In addition to the conventional weld structure provided between a pair of such high tensile strength steel bodies, there is provided at the fusion area of the conventional weld an additional bead of more than 6 mm. in width derived from a welding rod whose tensile strength is not greater than that of the base metal, which is to say the high tensile strength steel bodies which are welded together by the conventional weld. This additional bead can be applied either before or after the conventional weld. With such an additional bead in the vicinity of the area where the fusion line of the normal weld is located, the tendency to fracture due to brittleness is eliminated.

---

The present invention relates to a welding process of high tensile strength steel.

As a general rule, the strength of steel and the weldability thereof conflict with each other; i.e., the higher the strength is, the lower is the weldability. Therefore, not only in the case of the high tensile strength steel having the tensile strength of more than 100 kg./mm.$^2$ but also in the case of the high tensile strength steel having a lower tensile strength, for instance, 80 kg./mm.$^2$, an excessive absorption of heat at the time of welding causes a lower Charpy impact value and a higher brittleness in the fusion line, i.e., the boundary between the welded metal and the heat-affected area of the welding part. Furthermore this boundary undergoes a sudden change in hardness with a concomitant appearance of miner defects in the portion fused through welding such as undercuts, which in turn cause some trouble like brittle fracture along the line of fusion at a stress for instance, about 30 kg./mm.$^2$ far lower than the stress accompanying the normal usage of the steel in case tensile stress is applied. Under such circumstances, the high tensile strength steel cannot give full play to its intended characteristic. Many studies have been made for the improvement of weldability of high strength steel in an effort to prevent the emergence of such brittle fracture. For instance, carbon and additive alloys or elements have been studied with regard to quantities, and selection of appropriate conditions has been sought with regard to preheating, electric current for welding, voltage, welding bar, etc. In spite of these efforts involving adoption of complicated methods, the disadvantages mentioned above have not been successfully eradicated so far.

The object of this invention is the prevention of the emergence of brittle fracture on the welded part of high tensile strength steel. The invention also relates to an excellent method of welding which brings about an outright solution to the existing process extremely complicated in detail. It is a characteristic of this invention that undercuts and other minor defects in the welded part are removed, the metallic structure of the welded part is metallurgically improved, and the welding line slants further against the surface of the plate through the formation of bead more than 6 mm. wide in the vicinity of the fusion line or previous to welding at the end of the surface of the edge of base metal by means of the welding bar having a tensile strength not higher than that of base metal at the welding joint such as butt and fillet of the high tensile strength steel whose tensile strength is more than 80 kg./mm.$^2$, so that the condition of stress imposed on the brittle part of metal may be ameliorated.

Figure 1:
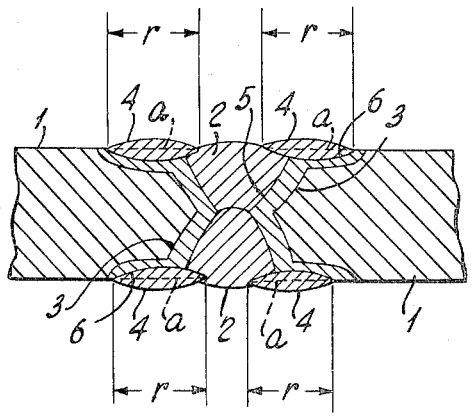
Figure 2:
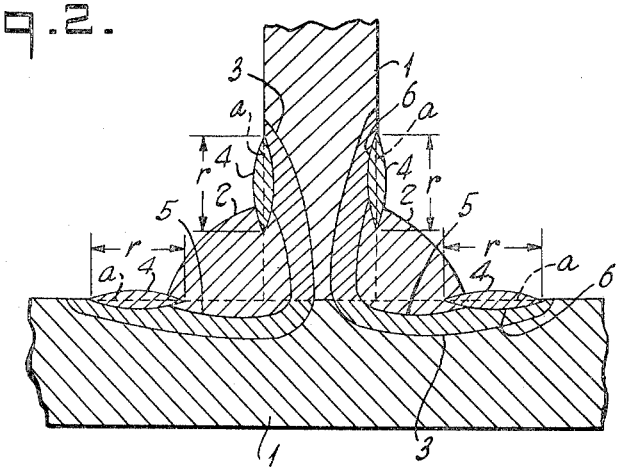
Figure 3:
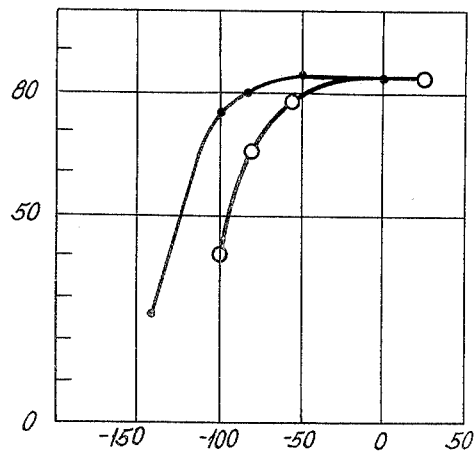
Figure 4:

The detailed explanation of this invention follows:

FIGURE 1 presents a sectional view for explaining the condition to be realized in case the welding process of this invention is applied to butt welding. FIGURE 2 presents a sectional view for explaining the condition to be realized in case the welding process of this invention is applied to fillet joint. FIGURE 3 shows the relation between the temperature at the time of tension and the fracture stress of the steel having the tensile strength of 80 kg./mm.$^2$. FIGURE 4 shows a fracture surface about the materials shown in Table 1.

The welding process of this invention is applicable not only to the double V-groove as shown in FIGURE 1 but also to butt welding having various forms of grooves and equally to fillet welding as shown in FIGURE 2.

Referring to double V-groove as shown in FIGURE 1 which is an example to explain the welding process of this invention, the base metal having a groove is butted and welded in the normal way, and then welding rod of high toughness is welded in the form of bead 4 more than 6 mm. wide in the vicinity of the plate member *a* of the fusion area 5. In this instance, preheating is made in compliance with the quality of base metal 1, and bead 4 welding is conducted by means of the welding rod which has the same quality as the base metal 1 or a little lower strength than the base metal 1. In addition, the surface of the bead 4 may be treated with a grinder depending upon the necessity of having an X-ray test.

It is also possible to place a bead more 6 mm. wide in the position 4 shown in FIGURE 1 previous to the welding so that it may be butted for welding in the normal way.

The number of the steps of welding according to this invention is not particularly large, since it is merely intended for welding bead 4.

The welded joint as appears after the welding of bead consists of the deposit metal 2 fused through normal welding by means of double V-joint of two base metals 1, the area 3 affected by heat of welding and the bead 4 intended to prevent the emergence of fracture as shown in FIGURE 1.

Table 1

| Test material | Width of bead to prevent initiation of brittle crack | Position of fractured surface | Quality of fractured surface |
|---|---|---|---|
| A | 0 (mm) | 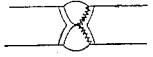 | Surface fractured due entirely to brittleness Percent brittleness 100% |
| B | 5 (mm) |  | Surface fractured due partly to brittleness Percent brittleness 50% (average) |
| C | 8 (mm) |  | Fracture through base metal Percent brittleness 0% |
| D | 13 (mm) |  | Fracture through base metal Percent brittleness 0% |

Table 1 shows the quality of the section as well as the stress that leads to fracture while making the width of beads ($r$ or the width of 4 as shown in FIGURE 1) 0, 5, 8, and 13 mm. respectively. The FIGURE 4 shows the fractured surface of the material shown in Table 1, while the numerals in the material show the width of beads in therms of milimeters. Test material A is a case showing the fracture made through a well known welding of high tensile strength steel with no bead attached. The fractured surface is on the fusion line between the welded metal and the base metal, giving rise to an overall brittle fracture evidently showing the disadvantages of the conventional method.

Test material B is a case showing the fracture with the width of bead kept at 5 mm. While a part of the fractured surface is silver white and ductile, another part is gray and brittle, and the proportion of brittle fractured surface to the total area of the fractured surface is about 50% on the average, showing that the effect of the bead is perceptible to a certain extent.

The test materials C and D are cases showing the fracture, provided with beads which have the widths of 8 mm. and 13 mm. respectively. In these cases base metal undergoes ductile fracture, and not brittle fracture results because of the existence of bead on the fused part. Thus we can clearly see the effectiveness of the welding process of this invention, i.e., of the attachment of bead on the surface of the fused part.

Furthermore, if the beads are placed on the center of the fused part, these beads will serve to improve the quality of the lower layers of metal so that they may prevent the emergence of brittle fracture. As a result of many more experiments the inventors have also been able to ascertain that the effect of this invention is rendered stronger by making the width of bead longer than 6 mm.

FIGURE 3 shows the effect of the bead that appears in case it is welded at a rather excessive heat to the steel material which has the reputed tensile strength of 80 kg./mm.$^2$. In the presence of the bead the stress stands at 76 kg./mm.$^2$ guaranteeing about 95% of the tensile strength, whereas in the absence of the bead at the test temperature of $-100°$ C. fracture arises at the stress of about 40 kg./mm.$^2$, i.e., about 50% of the tensile strength.

The main effects of the use of the bead in the welding process of high tensile strength steel of this invention:

(1) The fissure which appears at an end of the bead does not easily invade the fushion line 5 since an end of the bead recedes from the fusion line 5 and the fusion line 6 is inclined toward the normal direction of the plate surface. (2) Minor defects in the edge of the welded part such as undercuts usually disappear through repeated fusion, and especially the bead of this invention is formed by the welding rod low in tensile strength and high in weldability with a consequent display of this excellent result. (3) The cast structure of the fused part near the surface of the plate is changed into a refined structure by means of heating. For these reasons the welded part is assured of the tensile strength of about the same value as base metal.

It is noteworthy here that the increase of the area of the cross section of the welded part caused by the placing of the bead of this invention is less than 10% of the whole. As is known from the example of FIGURE 3, the increase of fracture stress is more than doubled. In this respect our invention is radically different from the conventional method for aluminum and the like wherein the bead was increased to augment the area of cross section, which in turn strengthened the welded part. In the case of mild steel neither softened part nor brittle part appears in the fushion area; therefore, the bead has not any more effect than to increase the area of cross section. Accordingly, mild steel does not need the bead of this invention at all.

As explained above, the welding process of this invention has been able to do away with the defects inherent in the conventional method of welding high tensile strength steel of more than 80 kg./mm.$^2$. In consequence the invention offers the economic advantage of enlarging the market for high tensile strength steel as a structure material which has had hitherto only a limited demand because of the relative difficulty of welding. Furthermore, this type of high tensile strength steel is largely used for a device requiring special safety such as a high-pressure vessel. In this connection, the process of this invention displays an epoch-making effect of increasing the said safety to a large extent and simplifying the welding technique.

What we claim is:

1. A process for welding two pieces of high tensile strength steel which will fail due to brittleness at a conventional weld and which have a tensile strength of more than 80 kg./mm.$^2$ comprising the step of providing in addition to the conventional weld, an additional bead which contacts the conventional weld and has a width greater than 6 mm. and is derived from a welding rod whose tensile strength is not greater than that of the high tensile strength steel base metal.

2. The process of claim 1 and wherein said additional bead is formed before the conventional weld.

3. The process of claim 1 and wherein the additional bead is formed after the conventional weld.

4. The process of claim 1 wherein the conventional weld is a butt weld.

5. The process of claim 1 and wherein the conventional weld is a fillet weld.

References Cited

UNITED STATES PATENTS 2,963,129  12/1960  Eberle _____ 29—504 X

OTHER REFERENCES

Metals Handbook, 1948 edition, published by American Society for Metals, edited by Taylor Lyman, pp. 554–555.

JOHN F. CAMPBELL, Primary Examiner

U.S. Cl. X.R.

29—504